Aug. 1, 1933.    J. A. DE SILVA    1,920,366
MANUFACTURE OF DRAWN GLASS
Filed Jan. 14, 1932

INVENTOR.
JOSEPH A. DE SILVA
BY Dorsey & Cole
ATTORNEYS.

Patented Aug. 1, 1933

1,920,366

UNITED STATES PATENT OFFICE

1,920,366

MANUFACTURE OF DRAWN GLASS

Joseph A. De Silva, Corning, N. Y., assignor to Corning Glass Works, Corning, N. Y., a Corporation of New York Application January 14, 1932. Serial No. 586,643

7 Claims. (Cl. 49—17.1)

This invention relates to the manufacture of drawn glass and more particularly to the production of thermometer tubing.

In order to provide clear visibility of the mercury column, thermometer tubing has long been made with a lens shaped cross-section and a strip of white or colored glass behind the bore which acts as a light shield. So far as I am aware, the only device which has been developed to continuously draw this form of tubing from a supply of molten glass is disclosed in Patent Number 1,829,429 issued to William J. Woods on the 27th day of October, 1931. The method contemplated in this patent includes drawing the tubing upwardly from a molten glass container through a shaping and conditioning means and hence the lengths to which the pieces of tubing may be drawn is limited.

The object of my invention is to efficiently and safely produce thermometer tubing by drawing horizontally with the advantages resulting therefrom such as ease of operation, the ability to produce tubing of unlimited lengths, and the like.

This and other objects may be accomplished by the use of my invention which embodies among its features drawing glass horizontally through a shaping sleeve, forming a bore in said glass and introducing contrasting glass into the glass which is being drawn so that the finished tubing will contain a strip of contrasting glass which will be located relative to the bore.

A specific form of my device is disclosed below and shown in the accompanying drawing, in which.

Figure 1:
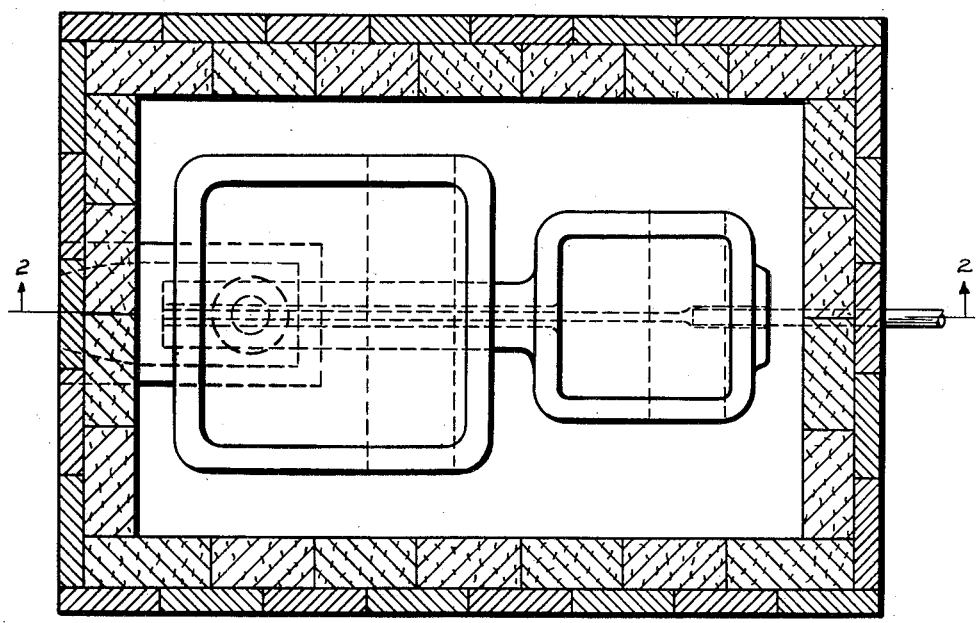
Fig. 1 is a horizontal sectional view through a furnace showing the relative positions of the glass containing pots.

Referring to the drawing in detail, a furnace 10 consisting of refractory bottom, side and end walls, is provided with a suitable refractory cover block 11 having filling openings 12 and 13 through which molten glass or glass batch is introduced into the melting pot to be hereinafter described. The walls of the furnace 10 are formed with the usual ports through which suitable burners (not shown) may be inserted. Formed in one of the end walls is an opening 14 and aligning with said opening 14 in the opposite end wall is an opening 15 for a purpose which will hereinafter appear. Extending into the furnace 10 through the opening 14 is a refractory shaping sleeve 16 containing a chamber 17 which tapers toward the opening 14 and has a cross-section for producing tubing of the desired shape. The inner end of the sleeve 16 is provided with a bore 18 which communicates with the chamber 17.

Supported on suitable blocks 19 directly below the filling opening 13 is a glass containing pot 20 having a horizontally projecting arm 21 the free end of which extends into the chamber 17 through the opening 18. Extending longitudinally and opening through the forward end of the arm 21 is a passage 22 which communicates at its opposite end with the interior of the pot 20 forming an outlet for the contents of the latter. Extending parallel with but spaced below the passage 22 in the arm 21 is a bore 23 which opens through the forward end of the arm and communicates at its opposite end with an air pipe 24 which enters the furnace through the opening 15.

Seated on suitable blocks 25 directly beneath the filling opening 12 is a glass containing pot 26 which is formed with a depending discharge spout 27 having tapered exterior walls for engagement with a tapered opening 28 which communicates through the side of the sleeve 16 with the chamber 17.

Figure 2:
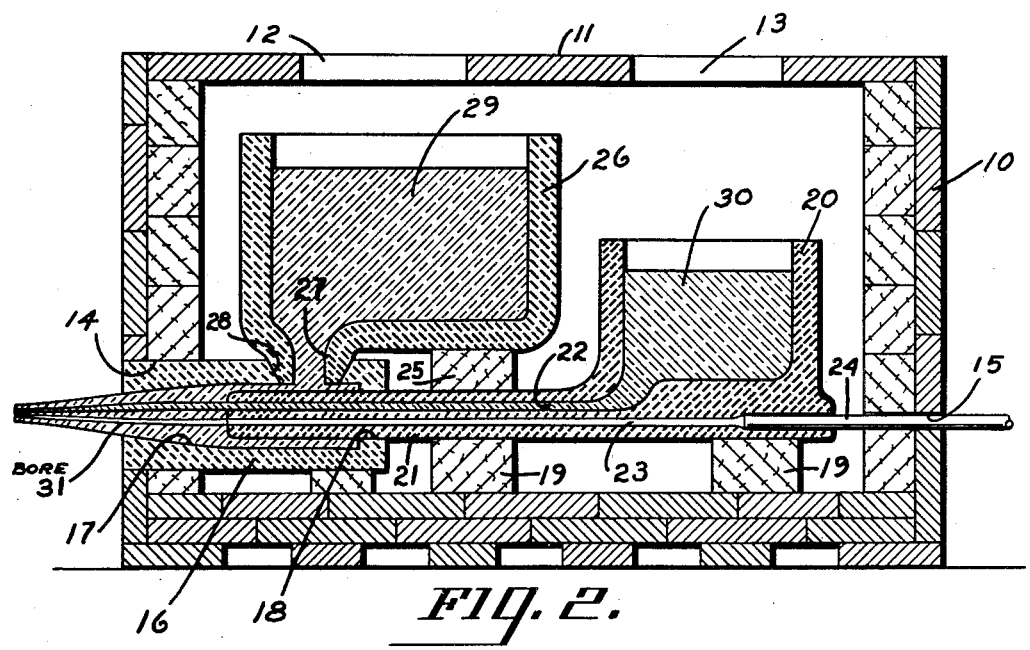
Fig. 2 is a longitudinal sectional view taken along the line 2—2 of Fig. 1.

In operation the pot 26 is filled with clear glass 29 while the pot 20 is filled with a contrasting glass 30. The glasses being in a molten condition will flow through their respective passages to the chamber 17 and emerge from the open end thereof as shown in Fig. 2. By forcing air through the pipe 15 a bore 31 will be formed in the emerging glass and its location is definitely determined by the position of the passage 22 with relation to the bore 23. Obviously the pressure and temperature of the air thus introduced may be regulated to produce bores having the desired characteristics. Moreover, by altering the cross-sectional shape of the chamber 17 tubing having any desired cross-section may be produced.

Molten clear and contrasting glass may be ladled or otherwise introduced into the pots 26 and 20, respectively, as the draw is in progress so that the tubing may be drawn continuously while being supported horizontally on rollers or other suitable supporting means (not shown) after it emerges from the chamber 17. I am thus able to satisfactorily produce drawn glass tubing of any desired length with a light shield embedded therein, maintaining the cross-section of this tubing uniform throughout the draw.

It is obvious that various changes may be made in the structure of my device without departing from the spirit of my invention as defined by the scope of the appended claims.

What I claim is:—

1. The method of producing glass tubing which includes flowing molten clear glass into a shaping sleeve, flowing a stream of molten contrasting glass into said sleeve, shaping the contrasting glass as it enters the clear glass, introducing bore-forming air into the glass, and simultaneously drawing both glasses horizontally.

2. The method of producing glass tubing containing a light shield of contrasting glass which includes flowing both varieties of glass, in a molten state, into a shaping sleeve shaping the contrasting glass as it enters the clear glass and drawing them horizontally.

3. The method of drawing glass tubing containing a light shield of contrasting glass which includes flowing molten clear glass into a sleeve, flowing a stream of contrasting glass into said clear glass, shaping said stream as it enters the clear glass, and simultaneously drawing both glasses horizontally from the sleeve.

4. In an apparatus for drawing glass, a horizontal shaping sleeve from which the glass is drawn, a molten glass reservoir for feeding glass into the sleeve, and means to introduce a preshaped stream of contrasting glass into the glass before it leaves the shaping sleeve.

5. In an apparatus for drawing glass tubing, a horizontal shaping sleeve from which the glass is drawn in the form of tubing, a molten glass reservoir for feeding glass into the sleeve, means extending into the sleeve to shape and introduce a stream of contrasting glass into the glass as it is drawn, a reservoir for feeding contrasting glass into the shaping and introducing means, and means to form a bore in the glass as it is drawn.

6. In an apparatus for drawing glass tubing, a horizontal shaping sleeve from which glass is drawn in the form of tubing, a member positioned in the sleeve to form a bore in the glass, and means to introduce a stream of contrasting glass into the glass as it is drawn.

7. In an apparatus for drawing glass tubing, a horizontal shaping sleeve from which glass is drawn in the form of tubing, means for introducing a preshaped stream of contrasting glass into said sleeve and means for introducing air into the glass as it is drawn to form a bore in the glass adjacent the stream of contrasting glass.

JOSEPH A. DE SILVA.